United States Patent [19]

Holzbaur

[11] 4,079,718
[45] Mar. 21, 1978

[54] FUEL INJECTION SYSTEM

[75] Inventor: Siegfried Holzbaur, Stuttgart, Germany

[73] Assignee: Robert Bosch GmbH, Stuttgart, Germany

[21] Appl. No.: 562,859

[22] Filed: Mar. 27, 1975

[30] Foreign Application Priority Data

Mar. 29, 1974 Germany .............. 2415182

[51] Int. Cl.² .......................... F02M 39/00
[52] U.S. Cl. .................. 123/139 AW; 123/119 R; 137/527.8; 261/50 A; 261/44 A
[58] Field of Search .............. 123/139 AW, 119 R; 73/228, 186; 261/50 A, 51, 65, 41 R, 44 R, 44 A; 137/527, 527.8, 484; 239/538

[56] References Cited

U.S. PATENT DOCUMENTS

| | | | |
|---|---|---|---|
| 1,493,894 | 5/1924 | Reece | 261/44 A |
| 1,534,212 | 4/1925 | Hess | 261/44 A |
| 1,746,681 | 2/1930 | Richardson | 261/44 A |
| 1,839,102 | 12/1931 | Kessel | 261/44 A |
| 2,026,948 | 1/1936 | Leibing | 261/65 |
| 2,750,955 | 6/1956 | Bredtschneider et al. | 137/527.8 |
| 2,755,818 | 7/1956 | Dietz | 261/44 A |
| 2,798,705 | 7/1975 | Lawrence | 261/44 R |
| 3,286,998 | 11/1966 | Mennesson | 123/139 AW |
| 3,352,318 | 11/1967 | Yanowitz | 137/527.8 |
| 3,650,258 | 3/1972 | Jackson | 123/139 AW |
| 3,671,208 | 6/1972 | Medsker | 261/65 |
| 3,771,504 | 11/1973 | Woods | 123/139 AW |
| 3,823,696 | 7/1974 | Mutschler et al. | 123/139 AW |

FOREIGN PATENT DOCUMENTS 427,878  12/1924  Germany .................. 261/41 R

Primary Examiner—Charles J. Myhre
Assistant Examiner—David D. Reynolds
Attorney, Agent, or Firm—Edwin E. Greigg

[57] ABSTRACT

A fuel injection system for externally ignited internal combustion engines including a device for injecting fuel into an air stream and an air measuring device comprising a valve having an airfoil portion. The air measuring valve is pivotably mounted within the suction tube of the engine, thereby exposing the air measuring valve to the air stream flowing through the suction tube. The air measuring valve is exposed to a combination of forces. One of the forces is an impedance induced force developed in accordance with the principle associated with impedance type valves and as a function of the pressure prevailing in front of and behind the air measuring valve when viewed in the direction of flow of the air stream in the suction tube. The other force is a lift force and is developed in accordance with the airfoil principle and as a result of an air flow about the airfoil portion of the air measuring valve. The impedance induced force occurs when the air flow through the suction tube is small, whereas when the air flow through the suction tube is large, the predominant force is the lift force developed in accordance with the airfoil principle.

20 Claims, 9 Drawing Figures

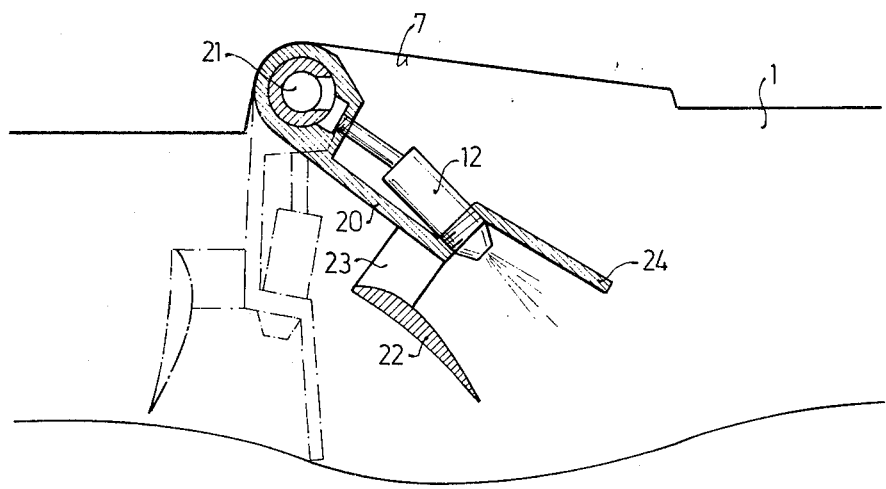
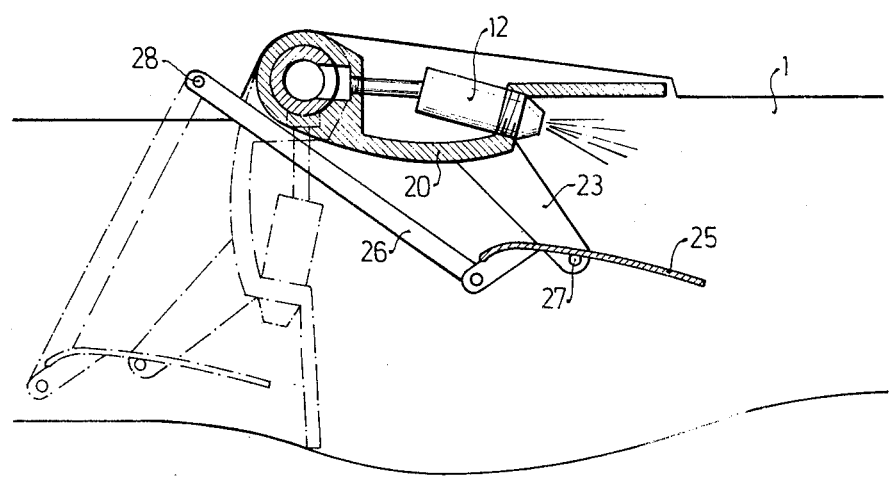

ical engines. The system comprises an air sensing or measuring device comprising a valve which is exposed to the air stream in the suction tube of the engine. The rotation of this valve by the air against a restoring force constitutes a gauge for the amount of air flowing through the suction tube.

FUEL INJECTION SYSTEM

BACKGROUND OF THE INVENTION

The present invention relates to a fuel injection system for externally ignited internal combustion engines. The system comprises an air sensing or measuring device comprising a valve which is exposed to the air stream in the suction tube of the engine. The rotation of this valve by the air against a restoring force constitutes a gauge for the amount of air flowing through the suction tube.

An air measuring device of this type is designed to measure as accurately as possible the amount of air flowing through the suction tube in order to meter a corresponding quantity of fuel to the quantity of air. To enable simple air measuring means to be used and to enable the quantity of air and fuel to be proportioned through influencing the fuel injection system while avoiding the need to make subsequent major adjustments, the relationships should be linear, for example, by maintaining two opposed non-linear but similar functions.

In the case of a known air measuring device of the above type, a baffle plate, which is vertically exposed to the air stream, is pushed according to the impedance type flow valve principle (hereinafter impedance principle) by an impedance induced force against a constant restoring force such that there is a linear relationship between the displacement path and the air flowing through the suction tube. Although the constant charging deficiency caused by the impedance is not disadvantageous in the case of small quantities of air, i.e. small air flow, at full load the charging deficiency in the engine cylinders is undesirable.

In the case of another known air measuring device operating according to the impedance principle the air measuring valve is disposed on one side and is swivelled about a pivot axis according to the quantity of air flowing through the suction tube. As a result of the changed angle of attack on the leading face of the air measuring device in the air flow direction and the associated variation in the differential pressure, the positioning force on the air measuring device decreases as the opening angle increases. This has the advantage that at full load reduced charging deficiencies occur. However, it has the disadvantage that at full load measuring becomes relatively inaccurate and the restoring force is not constant, with the resulting disadvantages of influencing the fuel injection system with non-linear proportioning of the air quantity and fuel quantity.

In the case of another known air measuring device, the valve is eccentrically mounted such that a smaller part of the valve projects into the portion of the suction tube in front of the mounting and the other part of the valve projects behind the mounting. With this air measuring device, the impedance, that is, the difference in the pressure in front of and behind the valve, is initially effective, i.e. when the valve is closed, to move the valve in its opening direction and subsequently and in accordance with the airfoil principle, the lift acting on the valve is also effective. Essentially only the differential surface between the larger and smaller surface parts of the valve acts as the resulting effective surface of the valve. The force engaging this effective surface is derived from the effective surface area times the associated air index (times ram pressure) acting on this effective surface. This force acts either as a force directed at right angles to the flow direction, or as an impedance induced force acting in the flow direction. This force forms with respect to the axis of rotation of the valve, the torque (adjusting moment) acting on the valve. With a sudden transition, in the case of this known air measuring device from the impedance principle to the combined impedance-airfoil principle, virtually undeterminable functions occur between the air quantity and the regulating distance of the valve and to ensure reliable fuel metering these must be corrected, either in the fuel metering device per se or by adjusting the restoring force acting on the valve.

OBJECT AND SUMMARY OF THE INVENTION

The principal object of the present invention is to provide a fuel injection system of the above-described type in which the air measuring device produces the least possible charging deficiencies at full load and in which the torque, possibly the resultant torque acting on the valve is either linear over the entire speed and load range of the engine or it may be easily balanced by appropriate restoring forces so that preferably a constant air velocity with a constant ram pressure always prevails in the section of the suction tube uncovered by the valve for constant air density.

This object and others are accomplished according to the present invention in that with small quantities of air, i.e. small air flow, the air measuring valve is deflected in accordance with the impedance principle, as a function of the pressure prevailing in front of and behind the air measuring valve. With larger quantities of air, i.e. large air flow, there is a gradual transition of the air measuring valve to a point where the air measuring valve operates with at least a partial surface according to the airfoil principle, whereby the corresponding surface has air circulating on both sides thereof and receives a thrust or lift as a function of the air quantity flowing past and hence a resultant moment due to the air forces is developed with respect to the pivot axis of the air measuring valve. As will be made apparent hereinafter, only a gradual transition enables a linear torque or moment to be obtained or enables the transition to be balanced with the restoring force by simple means. According to a corresponding feature of the invention, the smaller section of the valve relative to the axis (leading wing edge), which is pivotable in the part of the suction tube disposed in the flow direction in front of the axis, blocks the region it controls and then, as the quantity of air or air flow increases, it gradually uncovers this region until, at full load and maximum speed, it is completely open.

According to another feature of the present invention the air measuring valve consists of two parts which are displaceable relative to one another, one part of which (main valve) is mounted on the suction tube and the other part of which (auxiliary valve) is, on the one hand, mounted on the main valve and, on the other hand, is kinematically adjustable via a rod, thus influencing the force moment of the air which causes the displacement of the main valve. This enables the moment factor of the valve to be varied in a simple manner which may be used both for linearization and for correcting the fuel — air ratio ($\lambda$ correction or $\rho$ correction).

According to another feature of the present invention, a bore for supplying fuel is disposed in the pin measuring of the air measuring valve. The bore communicates with at least one channel provided in the air measuring valve. This channel terminates in at least one nozzle which is preferably disposed at the end of the air measuring valve. By virtue of this arrangement, on the one hand, the fuel is injected into the air stream in the highest speed region, thus providing for good mixing and, on the other hand, fuel metering can be effected with simple means and short lines by the air measuring device itself.

Other objects, features and advantages of the present invention will be made apparent in the following detailed description of the various embodiments thereof which is provided with reference to the accompanying drawings.

BRIEF DESCRIPTION OF THE DRAWINGS

FIGS. 3, 4 and 9 illustrate a second embodiment of the present invention comprising an auxiliary valve coupled to the main valve;

DESCRIPTION OF THE PREFERRED EMBODIMENTS

Figure 1:
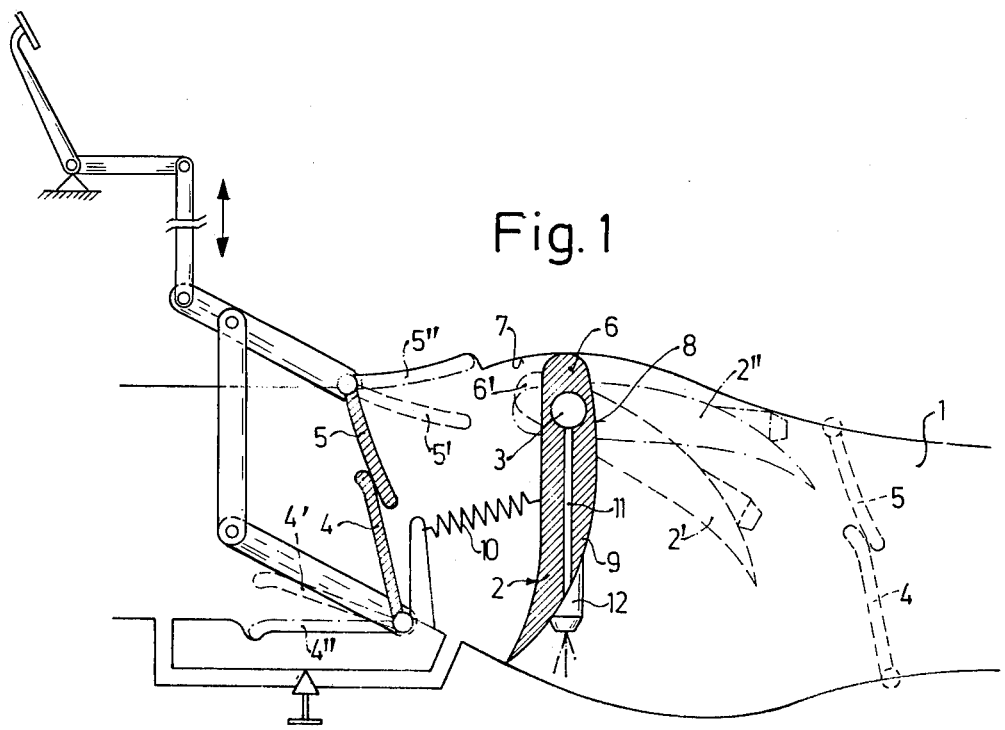
FIGS. 1 and 2 illustrate a first embodiment of the present invention comprising a monopart air metering valve and a two part throttle valve.

In FIG. 1 there is illustrated an air measuring valve 2 eccentrically mounted for rotation in a suction tube 1 by a pin 3. A two-part throttle valve 4, 5 is disposed in the suction tube 1 in the flow direction of the air in front of the air measuring valve 2. Part 5 of the throttle valve 4, 5 is pivotable in the direction of the air flow with respect to part 4 of the throttle valve. To equalize the forces, the two valve parts are coupled together so as to be oppositely rotatable. The structure for accomplishing this purpose is conventional as shown. In this way the excess force tending to displace one valve part against the air flow is compensated by the lesser force of the other valve part which is displaced with the air flow. Thus, in principle, equalization of the forces is effected in the same manner as with a butterfly throttle valve. The metering valve 2 can be viewed as having a leading portion 6 and a larger portion 9.

The disposition of the two-part throttle valve 4, 5 according to the present invention has considerable technical advantages in terms of flow. To illustrate this point, in FIG. 1 various positions of the air measuring valve 2 and the throttle valve 4, 5 are represented by the dashed lines. The corresponding reference numbers are appropriately identified with a single and double prime notation. The positions 2', 4', 5' relate to a first pivoting region and correspond to an average speed at partial load (part throttle). In the partial load position the leading portion 6' has been displaced from the suction tube wall 7 which it nearly engages during its idling and low speed positions. As a result, a part of the air flowing through the suction tube 1 can also flow along the rear surface 8 of the air flow measuring valve 2. The throttle valve part 5, which pivots in the direction of flow, impedes the flow around the rear surface 8 of the air flow measuring valve when the opening cross-sections of the throttle valve are small. However, as the cross-section of the passage increases, this rear surface flow increases. Conversely, by virtue of the throttle valve part 4, even with small air flows the larger pivot portion 9 of the air measuring valve 2 can be acted on by the air to achieve a corresponding, accurate rotation of the air valve even with a small flow of air. A restoring force for the air measuring valve 2 is produced by a spring 10 which acts directly on the air measuring valve 2. A hydraulic or alternative force can also be used for the restoring force.

With the air measuring valve 2 closed and with reduced air flows, the air measuring valve is displaced according to the impedance principle. With increased air flows, displacement is effected according to the airfoil principle. According to the impedance principle the valve is displaced by the pressure prevailing in front of and behind the air measuring valve, and according to the airfoil principle displacement of the air measuring valve depends on the lift forces of the air acting on the valve. With a constant lift, when the valve is opened, the predominant adjusting force gradually changes from an impedance force to a lift force, since the impedance force decreases as the valve is opened but the lift increases. Linearity of operation can be achieved if the ratio between the pivot angle or angle of rotation of the air measuring valve 2 and the cross-section which is left free by the same is constant, i.e. if a constant air velocity prevails in the cross-section. Further details of the transition of the forces will be provided in relation to the description of the diagram in FIG. 8.

The fuel is supplied via the pin 3 and a channel 11 which is formed in the larger pivot portion 9 of the air measuring valve 2. The fuel is injected by means of one or more injection nozzles 12.

Figure 2:
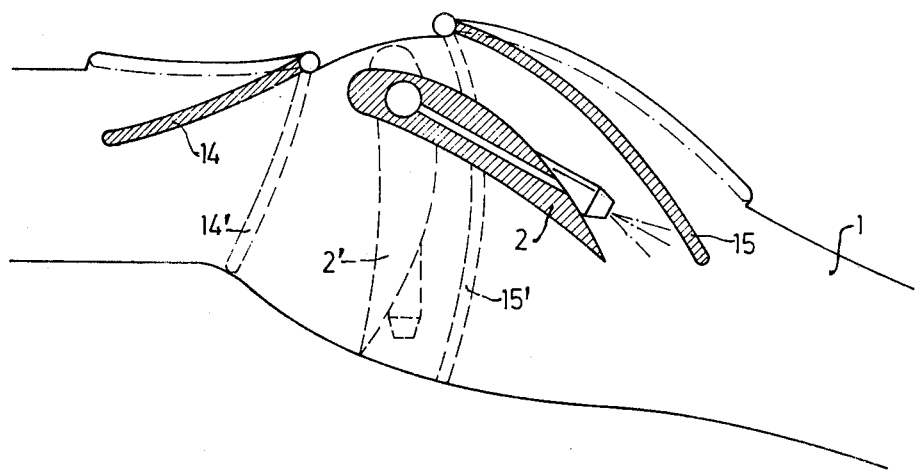

In the embodiment illustrated in FIG. 2, a part 14 of the throttle valve 14, 15 is disposed in front of the air measuring valve 2 in the air flow direction and the other part 15 is disposed behind the air measuring valve 2. Displacement of the parts 14 and 15 can be achieved by a structure similar to that used for parts 4 and 5. As is apparent from the position of the throttle valve parts 14', 15' represented by the dashed lines, these virtually cover the entire suction tube cross-section at the control location in the closed state. In the open state which is represented, a very favorable flow is also produced on the rear surface of the air measuring valve 2, in particular, because of the valve part 15. This is due to the fact that the air stream cross-section between the valve part 15 and the air measuring valve 2 is constant over virtually the entire length of the air measuring valve. As in the case of the embodiment illustrated in FIG. 1 and in all other embodiments the suction tube 1 preferably has a rectangular cross-section in the region of the valve control means, to enable the relationship between the angle of rotation and the cross-section which is left free, to be controlled more easily.

In the embodiment illustrated in FIG. 3, the air measuring valve 20 is rotatably mounted by a pin 21 on one side in the suction tube 1. As a result, no air can flow between the suction tube wall 7 and the air measuring valve 20 and thus a lift force cannot act directly on the valve 20. The valve 20 thus operates over the entire adjustment range according to the impedance principle. However, as the opening cross-section increases, the force produced by the impedance decreases, and an auxiliary valve 22 which is attached via a bracket 23 to the valve 20, becomes effective. The auxiliary valve 22 has air flowing on both sides according to the airfoil principle. When the air measuring valve 20 is closed, as represented by the dashed lines, the auxiliary valve 22 is vertically disposed with respect to the air flow so that no lifting action can be effective relative to the pivot axis of the pin 21. Only when the air measuring valve 20 has opened to some extent, do the lift forces begin to be effective until, when the cross-section is fully open, they produce the predominant torque on the air measuring valve 20 about the pivot axis of the pin 21. In contrast to the embodiments illustrated in FIGS. 1 and 2, in the embodiment of FIG. 3, the nozzle injects the fuel, depending on the position of the air measuring valve and nozzle, into the chamber disposed in front of or below the air measuring valve 20. Thus the fuel is always injected into the region where the velocity of the air is greatest, thus ensuring that the fuel-air mixture is well prepared, as, at the edge 24 of the air measuring valve 20. This edge is located at the region with the highest air velocity at which tearing eddies or vortices are produced which make for excellent mixing of the fuel and air. At high speeds and full load, and thus with a high air flow, the air measuring valve 20 which, under these conditions, is maintained in its displaced position by the forces associated with the auxiliary valve 22, osculates on the wall 7 of the suction tube 1 and thus offers a minimum of resistance. In this position the fuel is injected into the suction tube virtually in an axial direction such that with the now large quantities of fuel the least possible amount of fuel reaches the wall of the suction tube. With this configuration of the invention, the lift forces begin to be effective very early on, namely at the instant when the air flows past the air measuring valve 20. As the air measuring valve 20 causes a change in the flow direction, the lift forces acting on the auxiliary valve 22 not only act at right angles to the axis of the suction tube but, in accordance with their nature, at right angles to the enforced flow direction and thus initially largely in the axial direction of the suction tube 1.

The system illustrated in FIG. 4 corresponds to the principle of the embodiment illustrated in FIG. 3. In this case, the auxiliary valve 25 is not rigid but is rotatably mounted by a pin 27 to the web 23 of the main valve 20. The auxiliary valve 25 is controlled via a rod 26 such that it adopts essentially the same position with respect to the suction tube axis over the entire rotation range of the air measuring valve 20. The moment factor of the air measuring valve 20 can be changed by altering the position of the auxiliary valve 25. To this extent, the quantity of air to fuel can be varied by changing the position of the auxiliary valve 25 over the angle of rotation of the air measuring valve 20. An alteration or adjustment of this nature can be made by changing the point of suspension or the location of the mounting pin 28 of the rod 26. This can be done by conventional structure which is therefore not shown. For example, such an alteration or adjustment can be made as a function of an element measuring the toxic constituents in the exhaust gas in order to change the fuel-air ratio so as to obtain a more advantageous exhaust gas composition; or such an alteration or adjustment can be made by means of bellows to obtain an error correction when as a result of air pressure variations, for example considerable variations, the original adjustment which is sought and which was engaged initially, is no longer correct.

Figure 5:
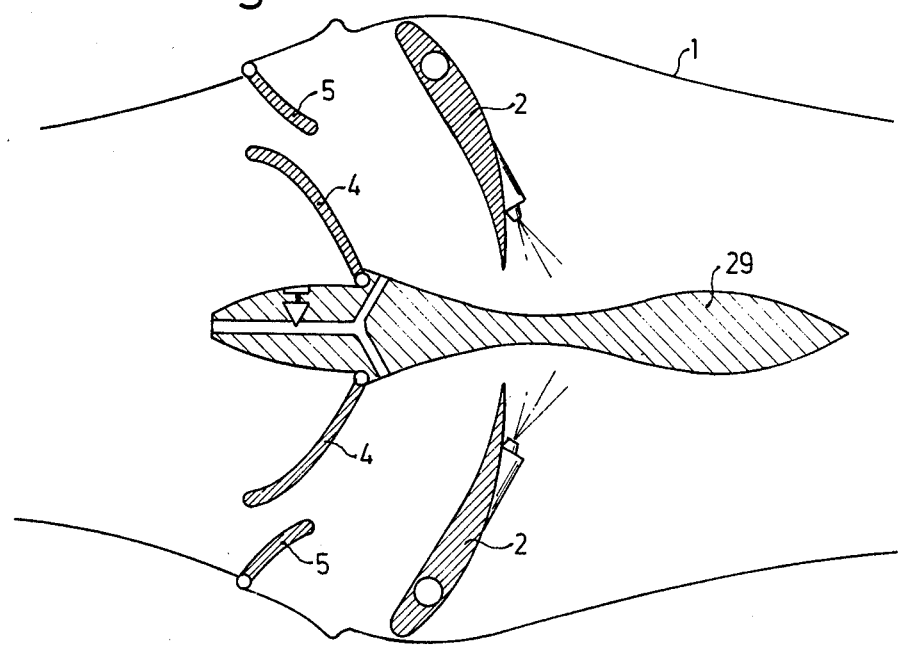
FIG. 5 illustrates two parallel air metering valves according to the first embodiment of the present invention.

In the case of large engines, it may be advantageous to arrange two air measuring valves operating with fuel injection in parallel, as indicated in FIG. 5. In this case, the central part 29 is rigidly connected to the suction tube 1. A double valve arrangement of this type may be advantageous for stratified charge engines.

Figure 6:
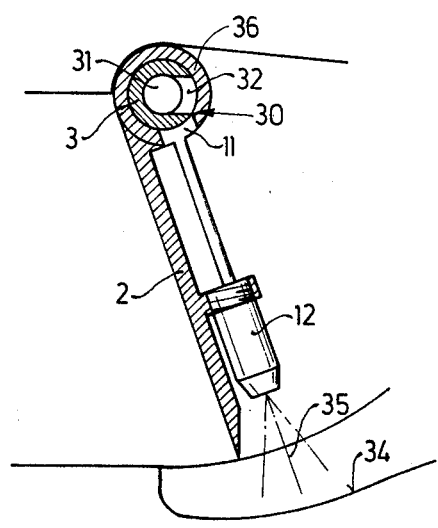
FIGS. 6 and 7 illustrate details of the fuel metering system according to the present invention.
Figure 7:
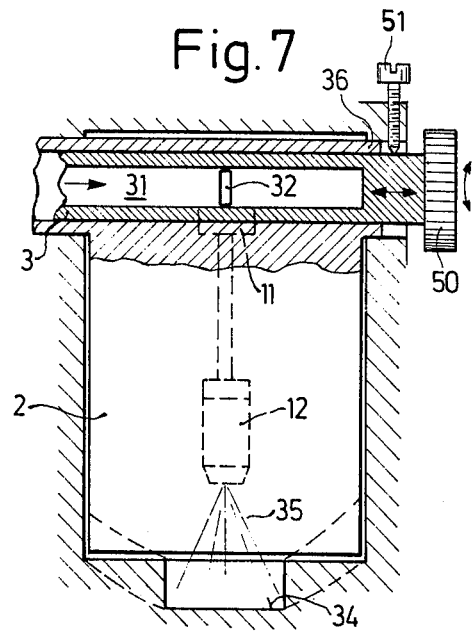

FIGS. 6 and 7 illustrate how the fuel is supplied through the pin 3 and is metered at the point 30 prior to being injected via the nozzle 12. The fuel flows in the direction of the arrow through the longitudinal bore 31 of pin 3. A slot 32 is disposed at right angles to the longitudinal axis and cooperates with the channel 11 of the air measuring valve 2. As is shown in FIG. 7, which shows a sectional view of the pin 3 and a bushing 36 passing straight through the slot 32, during rotation the channel 11 is increasingly opened, such that after a rotation of approximately 90°, the channel 11 or the entire slot 32 is opened. Thus, when the fuel is supplied to the metering point 11, 32, (fuel valve), under a constant pressure difference, the quantity of fuel which is metered corresponds to the particular angular position of the air measuring valve 2. The metering operation can also be effected in the most varied alternative ways, for example, in place of a slot 32, a bore which cooperates with the bore 11 can be provided, or in place of a slot an opening having a conical or alternative form can be provided.

The fuel is advantageously injected into a chamber 34. The width of this chamber increases in the flow direction and corresponds to the diameter of the injection cone 35 in the region of the chamber. The air is supplied via the valve in the lower speed range into the chamber 34 to obtain good fuel preparation.

Figure 8:
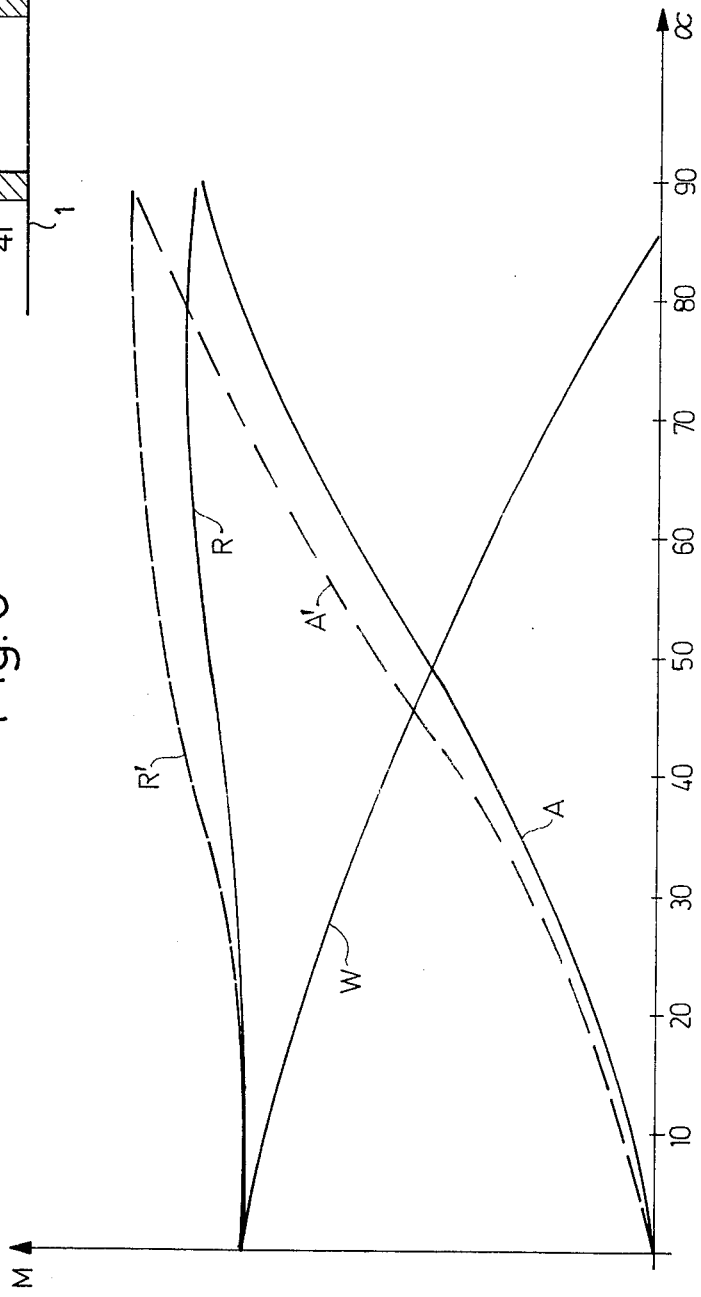
FIG. 8 is a diagram illustrating the variation of the moment acting on the air metering valve.

The operation of the air measuring valve will be described in further detail with reference to the diagram illustrated in FIG. 8. The moment M acting on the air measuring valve is represented by the ordinate and the angle of rotation of the air measuring valve by the abscissa. The curve W represents the variation of the moment over the angle of rotation which is caused to act on the air measuring valve by the flow impedance (pressure difference) and the curve A represents the variation of the moment produced by the lift force acting on the air measuring valve. The moment is formed in each case by the force of the air and the lever arm which is formed between the resultant center of pressure on the air measuring valve and the axis of rotation of the valve. When there is a flow impedance, the moment decreases as the opening angle increases because the impedance factor decreases and thus the pressure difference between the air pressure in front of and behind the air measuring valve also decreases. In contrast therewith, the lift moment increases since the effective surface remains constant, that is, the entire leading wing surface, but the lever arm, namely the distance projected at right angles to the axis between the axis and the point of application of the lift force, decreases as the valve opens. This opposition of the applied moments produces a resultant curve R, the variation of which can be influenced. Depending on the form of the air measuring valve, the auxiliary valve, the bracket with its kinematics and the suction tube with respect to the open cross-section, the variation of this resultant curve and thus the fuel-air ratio of the mixture may be predetermined. The dashed lines show the variation of the resultant which may be produced, for example, when the kinematic pivot point of the auxiliary valve according to FIG. 4 is altered. By virtue of a change in the composition of the exhaust gas, the moment variation A, A' can be altered by displacing the suspension point 28, as a result of which the resultant then changes to R'. In any event, the subject of the present invention ensures that at full load the charging deficiencies are kept to a minimum as, in this speed range, the air measuring valve is not adjusted according to the impedance principle but according to the airfoil principle which operates with substantially lower flow losses.

As shown in FIG. 7 the pin 3 can be displaced axially and rotatably against bushing 36 by means of a button 50. In order to lock the adjusted position a screw 51 is provided. These provisions allow fuel-flow-corrections and in turn accurate adjustment of the fuel-air ratio.

Figure 9:
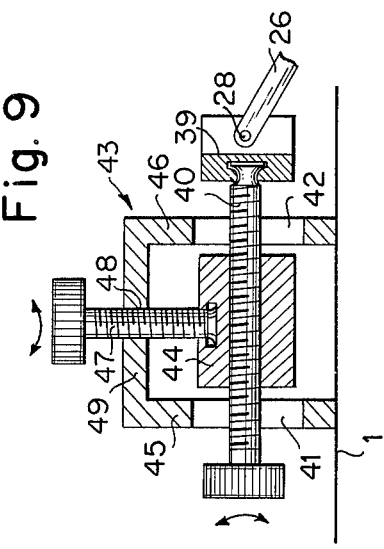

In FIG. 9 a possibility is shown as to how the mounting pin 28 of the rod 26 can be adjusted in horizontal and vertical direction. Pin 28 is connected (by means of part 39) with a threaded rod 40. This rod is put through vertical slots 41, 42 of adapter 43 fixed on the suction tube 1. A nut 44 is located between the two vertical parts 45, 46 of the adapter 43. By twisting rod 40 the mounting pin 28 can be adjusted horizontally. A second threaded rod 47 is connected with the nut 44 through thread 48 in the upper horizontal part 49 of adapter 43. By twisting rod 47 the nut 44 can be moved vertically and in turn pin 28 is moved accordingly.

What is claimed is:

1. A fuel injection system for externally ignited internal combustion engines including:
   a. a suction tube through which air is admitted to the internal combustion engine;
   b. an air measuring device comprising a valve having an airfoil portion;
   c. means pivotably mounting the air measuring valve within the suction tube thereby exposing the air measuring valve to the air stream flowing through the suction tube;
   d. restoring force means connected to the air measuring valve for applying a force to the air measuring valve in a direction substantially opposite to the direction of the air stream flowing through the suction tube, with the air measuring valve and the restoring means comprising a gauge for the amount of air flowing through the suction tube, and with the air measuring valve being biased by the restoring force means to substantially close the suction tube when no air is flowing therethrough; and
   e. fuel injection means operatively associated with the air measuring device for injecting fuel into the air stream flowing through the suction tube, and wherein:
      i. the air measuring valve is deflected by an impedance-induced force in accordance with the impedance principle as a function of the pressure prevailing in front of and behind the air measuring valve when viewed in the direction of flow of the air stream in the suction tube and when the quantity of air flowing through the suction tube is small;
      ii. the air measuring valve experiences a gradual transition under the influence of its deflection in accordance with the impedance-induced force and as the quantity of air flowing through the suction tube increases to a degree such that the airfoil portion develops a lift force in accordance with the airfoil principle and as a result of an air flow about said airfoil portion;
      iii. a resultant moment is developed relative to the pivot axis of the air measuring valve;
      iv. said fuel injection means includes at least one nozzle and a fuel valve;
      v. the means for pivotably mounting the air measuring valve includes a bushing with a bore in which a pin is disposed representing the fuel valve, said fuel valve including a further bore and at least one opening through which fuel is supplied to at least one channel;
      vi. said air measuring valve includes said at least one channel which communicates with said further bore through said opening, with the communication varying as a function of the deflection of the air measuring member; and
      vii. the nozzle is disposed at the end of the air measuring valve and communicates with the channel for discharging fuel into the suction tube.

2. The fuel injection system as defined in claim 1, wherein each air measuring valve is eccentrically mounted by said means for pivotably mounting with respect to the outer surface of the airfoil portion which is acted on by the air flow.

3. The fuel injection system as defined in claim 2, wherein a portion of each air measuring valve is pivoted due to the eccentric mounting in front of the pivot axis as a result of the air flow through the suction tube, and wherein said portion blocks the region of the suction tube which it controls when closed and gradually uncovers an increasing amount of said region as the air flow increases such that at fuel load and maximum speed said region is completely open.

4. The fuel injection system as defined in claim 3, wherein the portion of the suction tube wall adjacent to said portion of each air measuring valve has the same shape as the surface generated by pivoting said portion of said air measuring valve during its initial opening motion.

5. The fuel injection system as defined in claim 1, wherein at least one air measuring valve includes a main valve and an auxiliary valve, and wherein the airfoil portion is formed as the auxiliary valve with its outer surface shaped for producing a lift force, said auxiliary valve being disposed adjacent to and preferably in the flow direction in front of the main valve.

6. The fuel injection system as defined in claim 5, wherein the auxiliary valve is rigidly coupled to the main valve.

7. The fuel injection system as defined in claim 6, wherein the main valve is mounted at one side thereof directly to the suction tube.

8. The fuel injection system as defined in claim 1, wherein each restoring force means includes a spring and wherein the direction of the restoring force exerted by the spring and consequently the angle enclosed between the direction of the restoring force and the distance between the point of attachment of the spring on the air measuring valve and the pivot axis of the air measuring valve changes whereby the restoring moment on the air measuring valve with respect to the pivot axis is variable.

9. The fuel injection system as defined in claim 1, further including a two-part throttle valve which constitutes a device for arbitrarily controlling the quantity of air drawn into the suction tube to improve the supply air, said two parts being oppositely coupled for equalization of forces such that one part is displaceable in the air flow direction and the other part is simultaneously displaceable against the air flow direction, the parts being preferably mounted in parallel with the pivot axis of the air measuring valve.

10. The fuel injection system as defined in claim 9, wherein both parts of said throttle valve are mounted on opposite sides of the suction tube and in front of the air measuring valve when viewed in the direction of air flow.

11. The fuel injection system as defined in claim 9, wherein both parts of said throttle valve are mounted on opposite sides of the suction tube and behind the air measuring valve when viewed in the direction of air flow.

12. The fuel injection system as defined in claim 9, wherein one part of said throttle valve is disposed in front of the air measuring valve and the other part of said throttle valve is disposed behind the air measuring valve when viewed in the direction of air flow, and wherein both parts are preferably mounted on one side of the suction tube with the control surfaces of each part thus being virtually the size of the suction tube cross-section.

13. The fuel injection system as defined in claim 1, wherein the suction tube is at one point divided into two parallel sections in each of which an air measuring valve is mounted.

14. A fuel injection system for externally ignited internal combustion engines including:
 a. a suction tube through which air is admitted to the internal combustion engine;
 b. an air measuring device comprising a valve having an airfoil portion;
 c. means pivotably mounting the air measuring valve within the suction tube thereby exposing the air measuring valve to the air stream flowing through the suction tube;
 d. restoring force means connected to the air measuring valve in a direction substantially opposite to the direction of the air stream flowing through the suction tube, with the air measuring valve and the restoring means comprising a gauge for the amount of air flowing through the suction tube;
 e. fuel injection means operatively associated with the air measuring device for injecting fuel into the air stream flowing through the suction tube;
 f. bracket means; and
 g. rod means; and wherein:
  i. the air measuring valve includes a main valve and an auxiliary valve, with the airfoil portion being formed as the auxiliary valve for producing a lift force, said auxiliary valve being disposed adjacent to and preferably in the flow direction in front of the main valve;
  ii. the auxiliary valve is mounted on said bracket means to be rotatable relative to the main valve, with said rod means being mounted to the suction tube and connected to said bracket means;
  iii. the air measuring valve is deflected by an impedance-induced force in accordance with the impedance principle as a function of the pressure prevailing in front of and behind the air measuring valve when viewed in the direction of flow of the air stream in the suction tube and when the quantity of air flowing through the suction tube is small;
  iv. the auxiliary valve is kinematically displaceable with respect to the main valve thus enabling the air force moment causing displacement of the main valve to be influenced;
  v. the air measuring valve experiences a gradual transistion under the influence of its deflection in accordance with the impedance-induced force and as the quantity of air flowing through the suction tube increases to a degree such that the airfoil portion develops a lift force in accordance with the airfoil principle and as a result of an air flow about said airfoil portion; and
  vi. a resultant moment is developed relative to the pivot axis of the air measuring valve.

15. The fuel injection system as claimed in claim 14, wherein the mounting point of the rod means to the suction tube may be varied in order to change the air force moment or the fuel air mixture as a function of the air density or as a function of the engine characteristics such as the toxic content in the exhaust gas.

16. The fuel injection system as defined in claim 1, wherein said at least one opening is a radial opening which cooperates with said channel for metering fuel through said channel in accordance with the angular position of the air measuring valve.

17. The fuel injection system as defined in claim 1, wherein the pin is rotatably displaceable for accurate adjustment of the fuel-air ratio.

18. The fuel injection system as defined in claim 1, wherein the pin is axially displaceable for accurate adjustment of the fuel-air ratio.

19. The fuel injection system as defined in claim 1, wherein the pin is rotatably and axially displaceable for accurate adjustment of the fuel-air ratio.

20. The fuel injection system as defined in claim 1, wherein the suction tube includes a fuel injection chamber defined by a wall portion thereof, wherein fuel is injected into said chamber by the injection nozzle, wherein air is guided into said chamber by the air measuring valve in particular when there are small opening cross-sections in the suction tube, and wherein the width of said chamber corresponds approximately to the diameter of the cone formed by the injected fuel at the region of said chamber.

* * * * *